United States Patent
Binette et al.

(10) Patent No.: US 6,450,899 B1
(45) Date of Patent: *Sep. 17, 2002

(54) MULTI-LAYER IONOMERIC GOLF BALL CONTAINING FILLER AND METHOD OF MAKING SAME

(75) Inventors: Mark L. Binette, Ludlow; Thomas J. Kennedy, III, Wilbraham, both of MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 8 days.

This patent is subject to a terminal disclaimer.

(21) Appl. No.: 09/717,801

(22) Filed: Nov. 21, 2000

Related U.S. Application Data

(63) Continuation-in-part of application No. 09/337,918, filed on Jun. 29, 1999, now Pat. No. 6,149,536, which is a division of application No. 08/877,937, filed on Jun. 18, 1997, which is a continuation-in-part of application No. 08/490,963, filed on Jun. 15, 1995, now Pat. No. 6,042,488.

(51) Int. Cl.[7] .................................................. A63B 37/06
(52) U.S. Cl. .................................... 473/376; 473/378
(58) Field of Search ................................ 473/373, 374, 473/376, 377, 378

(56) References Cited

U.S. PATENT DOCUMENTS

| 696,890 A | 4/1902 | Kempshall |
|---|---|---|
| 712,388 A | 10/1902 | Kempshall |
| 2,741,480 A | 4/1956 | Smith |
| 2,973,800 A | 3/1961 | Muccino |
| 3,053,539 A | 9/1962 | Piechowski |
| 3,313,545 A | 4/1967 | Bartsch |
| 3,502,338 A | 3/1970 | Cox |
| 3,534,965 A | 10/1970 | Harrison et al. |
| 3,572,721 A | 3/1971 | Harrison et al. |
| 3,883,145 A | 5/1975 | Cox et al. |
| 3,989,568 A | 11/1976 | Isaac |
| 4,076,255 A | 2/1978 | Moore et al. |
| 4,123,061 A | 10/1978 | Dusbiber |
| 4,272,079 A | 6/1981 | Nakada et al. |
| 4,274,637 A | 6/1981 | Molitor |
| 4,431,193 A | 2/1984 | Nesbitt |
| 4,650,193 A | 3/1987 | Molitor et al. |
| 4,714,253 A | 12/1987 | Nakahara et al. |
| 4,852,884 A | 8/1989 | Sullivan |
| 4,858,923 A | 8/1989 | Gobush et al. |
| 4,858,924 A | 8/1989 | Saito et al. |
| 4,911,451 A | 3/1990 | Sullivan et al. |
| 4,919,434 A * | 4/1990 | Saito .......................... 473/374 |
| 4,979,746 A | 12/1990 | Gentiluomo |
| 5,002,281 A | 3/1991 | Nakahara et al. |
| 5,019,319 A | 5/1991 | Nakamura et al. |
| 5,026,067 A | 6/1991 | Gentiluomo |
| 5,048,838 A | 9/1991 | Chikaraishi et al. |

(List continued on next page.)

FOREIGN PATENT DOCUMENTS

| CA | 791003 | 7/1968 |
|---|---|---|
| EP | 637459 | 12/1990 |
| EP | 568332 A2 | 4/1993 |
| EP | 633043 A1 | 1/1995 |
| GB | 494031 | 10/1938 |
| GB | 2245580 A | 1/1992 |

*Primary Examiner*—Mark S. Graham
*Assistant Examiner*—Raeann Gorden

(57) ABSTRACT

Disclosed herein is a multi-layer golf ball having a core, an inner cover layer comprising an ionomer and a filler and having Shore D hardness of about 65 or less, and an outer cover layer comprising an ionomer and having a Shore D hardness of at least 60. The outer cover layer is harder than the inner cover layer. The sum of the thickness of the inner cover layer and the thickness of the outer cover layer is greater than 0.090 inches. A method of making the golf ball also is disclosed.

22 Claims, 1 Drawing Sheet

U.S. PATENT DOCUMENTS

| | | |
|---|---|---|
| 5,068,151 A | 11/1991 | Nakamura |
| 5,072,944 A | 12/1991 | Nakahara et al. |
| 5,096,201 A | 3/1992 | Egashira et al. |
| 5,104,126 A | 4/1992 | Gentiluomo |
| 5,131,662 A | 7/1992 | Pollitt |
| 5,150,906 A | 9/1992 | Molitor et al. |
| 5,184,828 A | 2/1993 | Kim et al. |
| 5,197,740 A | 3/1993 | Pocklington et al. |
| 5,253,871 A | 10/1993 | Viollaz |
| 5,273,286 A | 12/1993 | Sun |
| 5,273,287 A | 12/1993 | Molitor et al. |
| 5,304,608 A | 4/1994 | Yabuki et al. |
| 5,306,760 A | 4/1994 | Sullivan |
| 5,312,857 A | 5/1994 | Sullivan |
| 5,314,187 A | 5/1994 | Proudfit |
| 5,368,304 A | 11/1994 | Sullivan et al. |
| 5,439,227 A | 8/1995 | Egashira et al. |
| 5,556,098 A | 9/1996 | Higuchi et al. |
| 5,628,699 A | 5/1997 | Maruko et al. |
| 5,725,442 A | 3/1998 | Higuchi et al. |
| 6,042,488 A * | 3/2000 | Sullivan et al. ............. 473/374 |
| 6,149,536 A * | 11/2000 | Sullivan et al. ............. 473/376 |

* cited by examiner

MULTI-LAYER IONOMERIC GOLF BALL CONTAINING FILLER AND METHOD OF MAKING SAME

Related Applications

This is a continuation in part of U.S. Application Ser. No. 09/337,918 filed Jun. 29, 1999, now U.S. Pat. No. 6,149,536, which is a divisional of U.S. Application No. 08/877,937, filed Jun. 18, 1997, which is a continuation in part of U.S. Application No. 08/1490,963 field Jun. 15, 1995, now U.S. Pat. No. 6,042,488.

FIELD OF THE INVENTION

The present invention generally relates to golf balls, and more particularly to a golf ball having a multi-layer ionomeric cover.

BACKGROUNG OF THE INVENTION

Golf balls traditionally have been categorized in three different groups, namely as one-piece, two-piece and three-piece balls. Conventional two-piece golf balls include a solid resilient core having a cover of a different type of material molded thereon. Three-piece golf balls traditionally have included a liquid or solid center, elastomeric winding around the center, and a molded cover. Solid cores of both two and three-piece balls often are made of polybutadiene and the molded covers generally are made of natural balata, synthetic balata, or ionomeric resins.

Ionomeric resins are polymers containing interchain ionic bonding. As a result of their toughness, durability and flight characteristics, various ionomeric resins sold by E.l. DuPont de Nemours & Company under the trademark "Surlyn®" and by the Exxon Corporation (see U.S. Pat. No. 4,911,451) under the trademark "Escor®" and the trade name "lotek", have become the materials of choice for the construction of golf ball covers over the traditional "balata" (transpolyisoprene, natural or synthetic) rubbers. The softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid or maleic acid. Metal ions, such as sodium or zinc, are used to neutralize some portion of the acidic group in the copolymer, resulting in a thermoplastic elastomer exhibiting enhanced properties, i.e., durability, etc., for golf ball cover construction over balata.

While there are currently more than fifty (50) commercial grades of ionomers available from Exxon and DuPont, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting the desired combination of playability properties.

Golf balls are typically described in terms of their size, weight, composition, dimple pattern, compression, hardness, durability, spin rate, and coefficient of restitution (COR). One way to measure the COR of a golf ball is to propel the ball at a given speed against a hard massive surface, and to measure its incoming and outgoing velocity. The COR is the ratio of the outgoing velocity to the incoming velocity and is expressed as a decimal between zero and one.

There is no United States Golf Association limit on the COR of a golf ball but the initial velocity of the golf ball must not exceed 250±5 ft/second. As a result, the industry goal for initial velocity is 255 ft/second, and the industry strives to maximize the COR without violating this limit.

U.S. Pat. Nos. 4,431,193 and 4,919,434 disclose multi-layer golf balls. U.S. Pat. No. 4,431,193 discloses a multi-layer ball with a hard inner cover layer and a soft outer cover layer. U.S. Patent No. 4,919,434 discloses a golf ball with a 0.4–2.2 mm thick cover made from two thermoplastic cover layers.

SUMMARY OF THE INVENTION

An object of the present invention is to provide a golf ball having a soft compression while maintaining good durability and a high coefficient of restitution.

Another object of the invention is to provide a golf ball having a good coefficient of restitution as compared to other golf balls having a similar compression and surface hardness.

A further object of the invention is to provide a large size golf ball having a soft compression and moderate spin rate.

Yet another object of the invention is to provide a soft golf ball having a moderate spin rate and good carrying distance while maintaining a relatively soft compression.

Another object of the invention is to provide a method of making a golf ball having the properties described above.

The invention in a preferred form is a golf ball comprising a core, an inner cover layer comprising (a) a first resin composition containing an ionomer and (b) at least one part by weight of a filler based upon 100 parts by weight of the first resin composition, and an outer cover layer comprising an ionomer. The inner cover layer has a Shore D hardness of about 65 or less. The outer cover layer has a Shore D hardness which is greater than the Shore D hardness of the inner cover layer and is at least about 60. The sum of the thickness of the inner cover layer and the thickness of the outer cover layer is at least 0.090 inches.

The inner cover layer preferably contains at least five parts by weight of filler. The filler preferably is selected from the group consisting of precipitated hydrated silica, clay, talc, asbestos, glass, aramid fibers, mica, calcium metasilicate, barium sulfate, zinc sulfide, lithopone, silicon carbide, silicates, diatomaceous earth, carbonates, metals, metal alloys, metal oxides, metal stearates, particulate carbonaceous materials, cotton flock, cellulose flock, leather fiber, micro balloons and combinations thereof. In a particularly preferred form of the invention, the filler includes at least one member selected from the group consisting of metals and metal alloys. In a particularly preferred form of the invention, the filler is a density-adjusting filler which has a specific gravity at least 0.05 higher or lower than the specific gravity of the resin composition.

The golf ball core typically is selected from the group consisting of non-wound cores containing liquid, gel or solid and wound cores. Preferably, the core is solid.

The golf ball of the invention preferably has a COR of at least 0.780, more preferably at least 0.790, and most preferably at least about 0.800. In a particularly preferred form of the invention, the golf ball is an oversized ball having a diameter of at least 1.70 inches. The golf ball has a weight in the range of 43.0–46.0 g. Preferably, the ratio of the diameter of the ball to the sum of the thickness of the inner cover layer and outer cover layer is less than 19:1 and more preferably less than about 17:1. The PGA compression of the golf ball according to a preferred embodiment of the invention is no more than about 110, more preferably no more than about 107 and even more preferably no more than about 100.

A further preferred form of the invention is a golf ball comprising a core, an inner cover layer comprising (a) a first resin composition containing an ionomer and (b) one or more parts by weight of a filler with a specific gravity which is at least 0.05 higher or lower than the specific gravity of the first resin composition, the parts by weight of filler being based upon 100 parts by weight of the first resin composition, and an outer cover layer comprising an ionomer. The outer cover layer has a Shore D hardness of at least 60 and is harder than the inner cover layer. The golf ball has a PGA compression of no more than about 110 and a coefficient of restitution of at least 0.780. The ratio of the diameter of the ball to the sum of the thickness of the inner cover layer and the thickness of the outer cover layer is less than 19:1.

Another preferred form of the invention is a golf ball comprising a core, an inner cover layer comprising (a) a first resin composition containing an ionomer and (b) one or more parts by weight of at least one of a density-adjusting filler and a flex modulus adjusting filler based upon 100 parts by weight of the first resin composition, and an outer cover layer comprising an ionomer. The inner cover layer has a Shore D hardness of no more than about 65. The outer cover layer has a Shore D hardness of at least 60 and is harder than the inner cover layer. The golf ball has a PGA compression of no more than about 110 and a coefficient of restitution of at least 0.780. The ratio of the diameter of the ball to the sum of the thickness of the inner cover layer and the thickness of the outer cover layer is less than 19:1.

Another preferred form of the invention is a method of making a multi-layer golf ball. The method comprises the steps of (1) obtaining a golf ball core, (2) forming an inner cover layer over the core, the inner cover layer comprising (a) a first resin composition containing an ionomer and (b) at least one part by weight of a filler based upon 100 parts by weight of the first resin composition, and (3) forming an outer cover layer over the inner cover layer. The inner cover layer has a Shore D hardness of about 65 or less. The outer cover layer has a Shore D hardness of at least about 60 and is harder than the inner cover layer. The sum of the thickness of the inner cover layer and the thickness of the outer cover layer is at least 0.090 inches.

Yet another preferred form of the invention is a method of making a multi-layer golf ball, comprising obtaining a golf ball core, forming an inner cover layer over the core, the inner cover layer comprising (a) a first resin composition containing an ionomer and (b) one or more parts by weight of at least one of a density-adjusting filler and a flex modulus-adjusting filler, the parts by weight of filler being based upon 100 parts by weight of the first resin composition, and forming an outer cover layer over the inner cover layer. The inner cover layer has a Shore D hardness of no more than about 65. The outer cover layer has a Shore D hardness of at least about 60 and is harder than the inner cover layer. The combined thickness of the inner cover layer and the outer cover layer is at least 0.090 inches.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

Figure 1:
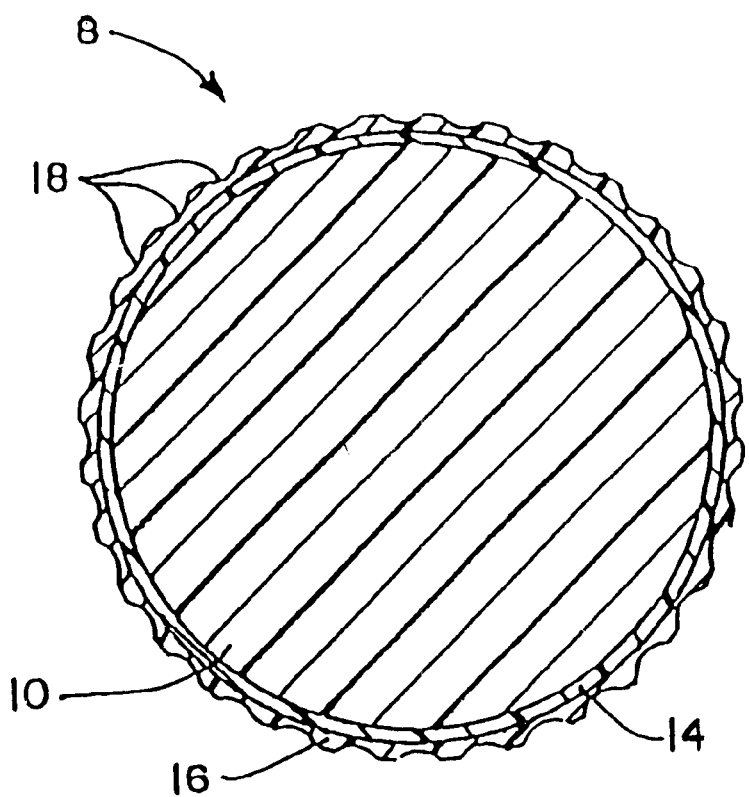
FIG. 1 shows a cross-sectional view of a golf ball according to a preferred embodiment of the invention.
Figure 2:
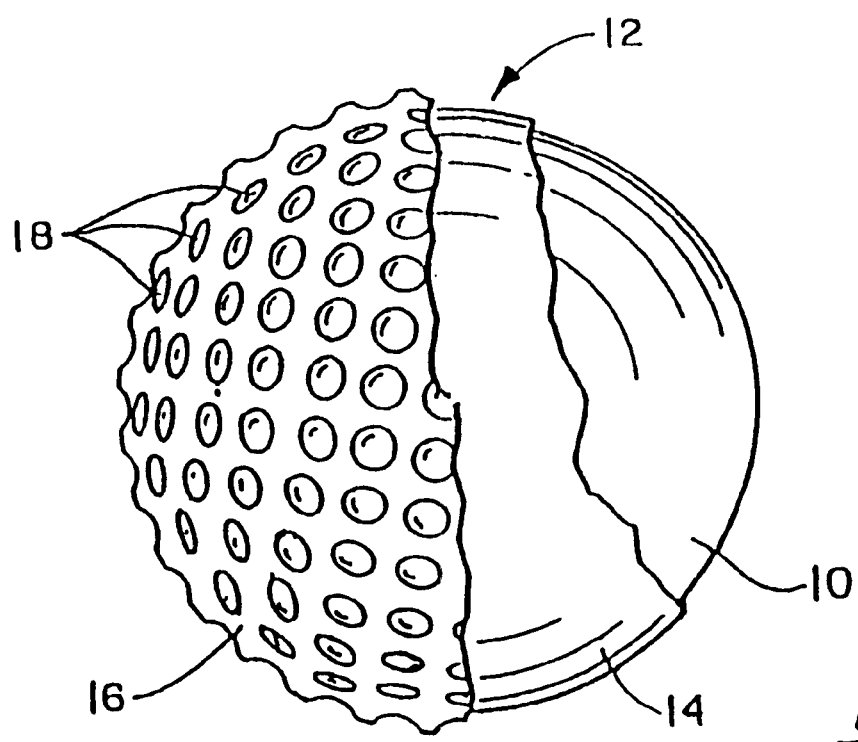
FIG. 2 shows a diametrical cross-sectional view of the golf ball shown in FIG. 1.

The golf ball according to the invention has a central core and a thick cover which includes at least two ionomeric layers. The inner cover layer is softer than the outer cover layer. This type of construction results in a golf ball having a favorable combination of soft compression and low spin while maintaining good COR.

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

PGA compression is another important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 1 00, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a fixed initialized load of 200 pounds. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160–Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

Referring now to the drawings, a golf ball according to the invention is shown and is designated as 8. The diameter of the golf ball can range from about 1.58–1.70 inches or more. In one embodiment, the golf ball has a diameter of at least about 1.58 to about 1.67 inches. Another embodiment provides for a golf ball having a diameter of from about 1.58 inches to about 1.65 inches. A further embodiment provides for a golf ball having a diameter of from about 1.58 inches to about 1.62 inches. Typically, the diameter is about 1.68 inches. Another embodiment of the invention is particularly useful with golf balls having a diameter of 1.70 inches or more.

The golf ball includes a central solid core 10 and a multi-layer cover 12. The multi-layer cover includes an inner cover layer 14, and an outer cover layer 16 with dimples 18. The inner cover layer 14 comprises an ionomer and is softer than the outer cover layer 16. The ionomer that is used to form the inner cover layer 14 can be a single type of ionomer or a blend of two, three, four or more types of ionomers. Hardening and/or softening modifiers can be blended with the ionomers. The inner cover layer has a Shore D hardness of about 65 or less, more preferably 20–63 and most preferably 40–60.

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

In a preferred form of the invention, the inner cover layer contains at least 50 parts by weight ionomer based upon 100 parts by weight of resin, and more preferably at least 75 parts by weight ionomer based upon 100 parts by weight of resin. The outer cover layer preferably contains at least 50 parts by weight ionomer based upon 100 parts by weight of resin, and more preferably at least 75 parts by weight ionomer based upon 100 parts by weight of resin. Preferably, the inner cover layer comprises an ionomer with an average wt % acid content of about 15 or less which is at least 10% neutralized. In a particularly preferred form of the invention, the inner cover layer 14 constitutes a blend of two types of ionomers in which one component of the blend is an ethylene-acrylic acid or ethylene-methacrylic acid copolymer containing$\geq$15 wt % acid groups which are at least partially neutralized with a cation, and the other type of ionomer is a terpolymer of ethylene, acrylic acid or methacrylic acid and a softening termonomer such as butyl acrylate or methyl acrylate, resulting in an overall wt % acid content of about 15 or less.

The inner cover layer 14 also contains at least one part by weight of a filler based upon 100 parts by weight of the resin composition. The filler preferably is used to adjust the density, flex modulus, hardness, mold release, and/or melt flow index of the inner cover layer. An increase in the density of the inner cover layer in combination with a reduction in density of the core will result in an increase in moment of inertia for a ball. Furthermore, fillers can be used to improve durability or reduce molding cycle time. The COR of a ball can be improved in some instances by removing filler from the core and placing filler in the inner cover layer. Adhesion between the inner cover layer and one or both of the core and the outer cover layer can be improved through the use of fillers. Furthermore, fillers can be used to improve ball performance at extreme temperatures.

More preferably, at least when the filler is for adjustment of density or flex modulus, it is present in an amount of at least five parts by weight based upon 100 parts by weight of the resin composition. With some fillers, up to about 200 parts by weight probably can be used. A density adjusting filler according to the invention preferably is a filler which has a specific gravity which is at least 0.05 and more preferably at least 0.1 higher or lower than the specific gravity of the resin composition. Particularly preferred density adjusting fillers have specific gravities which are higher than the specific gravity of the resin composition by 0.2 or more, even more preferably by 2.0 or more. A flex modulus adjusting filler according to the invention is a filler which, when used in an amount of e.g. 1–100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler. A mold release adjusting filler is a filler which allows for easier removal of part from mold, and eliminates or reduces the need for external release agents which otherwise could be applied to the mold. A mold release adjusting filler typically is used in an amount of up to about 2 wt % based upon the total weight of the inner cover layer. A melt flow index adjusting filler is a filler which increases or decreases the melt flow, or ease of processing of the composition.

The inner cover layer, outer cover layer and core may contain coupling agents that increase adhesion of materials within a particular layer e.g. to couple a filler to a resin composition, or between adjacent layers. Non-limiting examples of coupling agents include titanates, zirconates and silanes. Coupling agents typically are used in amounts of 0.1–2 wt % based upon the total weight of the composition in which the coupling agent is included.

A density adjusting filler is used to control the moment of inertia, and thus the initial spin rate of the ball and spin decay. The addition of a filler with a lower specific gravity than the resin composition results in a decrease in moment of inertia and a higher initial spin rate than would result if no filler were used. The addition of a filler with a higher specific gravity than the resin composition results in an increase in moment of inertia and a lower initial spin rate. High specific gravity fillers are preferred as less volume is used to achieve the desired inner cover total weight. Non-reinforcing fillers are also preferred as they have minimal effect on COR. Preferably, the filler does not chemically react with the resin composition to a substantial degree, although some reaction may occur when, for example, zinc oxide is used in a cover layer which contains some ionomer.

The density-increasing fillers for use in the invention preferably have a specific gravity in the range of 1.0–20. The density-reducing fillers for use in the invention preferably have a specific gravity of 0.06–1.4, and more preferably 0.06–0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index increasing fillers have a flow enhancing effect due to their relatively high melt flow versus the matrix. The melt flow index decreasing fillers have an opposite effect due to their relatively low melt flow index versus the matrix.

Fillers which may be employed in the inner cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows:

TABLE A

| Filler Type | Spec. Grav. | Comments |
| --- | --- | --- |
| Precipitated hydrated silica | 2.0 | 1,2 |
| Clay | 2.62 | 1,2 |
| Talc | 2.85 | 1,2 |
| Asbestos | 2.5 | 1,2 |
| Glass fibers | 2.55 | 1,2 |
| Aramid fibers (KEVLAR ®) | 1.44 | 1,2 |
| Mica | 2.8 | 1,2 |
| Calcium metasilicate | 2.9 | 1,2 |
| Barium sulfate | 4.6 | 1,2 |
| Zinc sulfide | 4.1 | 1,2 |
| Lithopone | 4.2–4.3 | 1,2 |
| Silicates | 2.1 | 1,2 |
| Silicon carbide platelets | 3.18 | 1,2 |
| Silicon carbide whiskers | 3.2 | 1,2 |
| Tungsten carbide | 15.6 | 1 |
| Diatomaceous earth | 2.3 | 1,2 |
| Polyvinyl chloride | 1.41 | 1,2 |
| Carbonates | | |
| Calcium carbonate | 2.71 | 1,2 |
| Magnesium carbonate | 2.20 | 1,2 |
| Metals and Alloys (powders) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.2 | 1 |
| Iron | 7.86 | 1 |
| Steel | 7.8–7.9 | 1 |
| Lead | 11.4 | 1,2 |
| Copper | 8.94 | 1 |
| Brass | 8.2–8.4 | 1 |
| Boron | 2.34 | 1 |
| Boron carbide whiskers | 2.52 | 1,2 |
| Bronze | 8.70–8.74 | 1 |
| Cobalt | 8.92 | 1 |
| Beryllium | 1.84 | 1 |
| Zinc | 7.14 | 1 |
| Tin | 7.31 | 1 |

TABLE A-continued

| Filler Type | Spec. Grav. | Comments |
| --- | --- | --- |
| Metal Oxides | | |
| Zinc oxide | 5.57 | 1,2 |
| Iron oxide | 5.1 | 1,2 |
| Aluminum oxide | 4.0 | |
| Titanium oxide | 3.9–4.1 | 1,2 |
| Magnesium oxide | 3.3–3.5 | 1,2 |
| Zirconium oxide | 5.73 | 1,2 |
| Metal Stearates | | |
| Zinc stearate | 1.09 | 3,4 |
| Calcium stearate | 1.03 | 3,4 |
| Barium stearate | 1.23 | 3,4 |
| Lithium stearate | 1.01 | 3,4 |
| Magnesium stearate | 1.03 | 3,4 |
| Particulate carbonaceous materials | | |
| Graphite | 1.5–1.8 | 1,2 |
| Carbon black | 1.8 | 1,2 |
| Natural bitumen | 1.2–1.4 | 1,2 |
| Cotton flock | 1.3–1.4 | 1,2 |
| Cellulose flock | 1.15–1.5 | 1,2 |
| Leather fiber | 1.2–1.4 | 1,2 |
| Micro balloons | | |
| Glass | 0.15–1.1 | 1,2 |
| Ceramic | 0.2–0.7 | 1,2 |
| Fly ash | 0.6–0.8 | 1,2 |
| Coupling Agents Adhesion Promoters | | |
| Titanates | 0.95–1.17 | |
| Zirconates | 0.92–1.11 | |
| Silane | 0.95–1.2 | |

COMMENTS:
1 Particularly useful for adjusting density of the inner cover layer.
2 Particularly useful for adjusting flex modulus of the inner cover layer.
3 Particularly useful for adjusting mold release of the inner cover layer.
4 Particularly useful for increasing melt flow index of the inner cover layer.
All fillers except for metal stearates would be expected to reduce the melt flow index of the inner cover layer.

The amount of filler employed is primarily a function of weight requirements and distribution.

The outer cover layer 16 comprises an ionomer. The outer layer 16 can contain a single type of ionomer or a blend of two, three, four or more types of ionomers. Furthermore, a hardening and/or softening modifier can be added. The outer cover layer is harder than the inner cover layer, and has a Shore D hardness of about 60 or more, more preferably 65 or more and most preferably 68 or more. In a particularly preferred form of the invention, the outer cover layer contains an ionomer having at least 16 weight % acid groups, which are at least partially neutralized.

The inner and outer layers together form a cover having a thickness of 0.090–0.250 inches, more preferably about 0.10–0.20 inches, and most preferably about 0.11–0.1 5 inches. Preferably, the inner cover layer has a thickness of 0.025–0.200 inches, and more preferably 0.050–0.100 inches. The outer cover layer preferably has a thickness of about 0.025 to 0.200 inches, or more preferably 0.050–0.100 inches. The ratio of the diameter of the ball to the thickness of the cover, i.e. the sum of the thickness of the inner cover layer and the outer cover layer, is no more than about 19:1, preferably no more than about 17:1 and more preferably no more than about 15:1.

The hardness of the inner and outer cover layers, and the compositions and thicknesses of these layers are appropriate to result in a golf ball having a COR of at least 0.780, more preferably at least 0.790and most preferably at least 0.800. The golf ball of the invention has an overall PGA compression of 30–110, more preferably 50–107, and most preferably 60–90. Preferably, the spin rate of the golf balls is no more than about 8000 revolutions per minute (rpm) when struck with a 9-iron under conditions of launch angle, ball speed and tee position which produce a spin rate of about 7100 rpm for a two-piece hard covered ball (1994 Top-Flite XL) and a spin rate of about 9700 rpm for a thread wound balata covered ball (1994 Titleist Tour 100) using the same club. This relatively low spin rate provides the advantage of less sideways spin for improved accuracy and less backspin for improved rolling distance.

The core of the golf ball preferably is made of a crosslinked unsaturated elastomer and preferably comprises a thermoset rubber such as polybutadiene, but also can be made of other core materials which provide sufficient COR. The diameter of the core is determined based upon the desired overall ball diameter, minus the combined thicknesses of the inner and outer cover layers. The COR of the core is appropriate to impart to the finished golf ball a COR of at least 0.780, and preferably at least 0.790. The core typically has a diameter of about 1.0–1.6 inches, preferably 1.4–1.6 inches, a PGA compression of 80–100, and a COR in the range of 0.770–0.830.

Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The inner cover layer preferably comprises an ionomer having an average wt % acid content of about 15 or less which is at least 10% neutralized. Preferably, the inner cover layer 14 includes a blend of hard and soft ionomer resins including but not limited to those described in U.S. Pat. No. 4,884,814 and 5,120,791, both of which are incorporated herein by reference. For example, a blend of a high modulus ionomer (i.e., a hard ionomer) and a low modulus ionomer (i.e., a soft ionomer) in a mixture can be used. A high modulus ionomer is one which has a flexural modulus of about 15,000–70,000 psi or more as measured under ASTM method D-790. The hardness of this type of ionomer is at least 50 on the Shore D scale as measured in accordance with ASTM method D-2240. A low modulus ionomer which can be blended with the high modulus ionomer to form the inner layer has a flexural modulus of about 1,000 to about 15,000 psi (ASTM D-790), and a hardness of about 20–40 on the Shore D scale (ASTM D-2240).

The hard ionomer resins used in blends to form the inner cover layer 14 include ionic copolymers which are the e.g. sodium, zinc, magnesium, calcium, manganese, nickel, barium, tin, copper, potassium or lithium, etc. salt, or blend thereof, of the reaction product of an olefin having from 2 to 8 carbon atoms and an unsaturated monocarboxylic acid having from 3 to 8 carbon atoms and which result in a ball having the desired combination of COR, compression, and inner cover layer hardness. The carboxylic acid groups of the copolymer may be totally or partially, that is 10–100%, neutralized. The hard ionomeric resins typically are copolymers of ethylene with acrylic and/or methacrylic acid. Two or more hard ionomer resins can be blended.

The metal cation salts utilized in the invention are those salts which provide the metal cations capable of neutralizing, to various extents, the carboxylic acid groups of the high acid copolymer. These include acetate, oxide or hydroxide salts of e.g. lithium, calcium, zinc, sodium, potassium, nickel, magnesium, barium, tin, copper and manganese, etc.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide and magnesium acetate. Sources of manganese include manganese acetate and manganese oxide.

The metal cation neutralized high acid ionomer resins can be produced by reacting the high acid base copolymer with various amounts of the metal cation salts above the crystalline melting point of the copolymer, such as at a temperature from about 200 F. to about 500° F., preferably from about 250° F. to about 350° F. under high shear conditions at a pressure of from about 10 psi to 10,000 psi. Other blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

Examples of commercially available hard ionomeric resins which can be used in a blend to form the inner cover layer 14 include the hard sodium ionic copolymer sold under the trademark Surlyn®8940 and the hard zinc ionic copolymer sold under the trademark Surlyn®9910. Surlyn®8940 is a copolymer of ethylene with methacrylic acid with about 15 weight % acid which is about 29% neutralized with sodium ions. This resin has an average melt flow index of about 2.8. Surlyn®9910 is a copolymer of ethylene and methacrylic acid with about 15 weight % acid which is about 58% neutralized with zinc ions. The average melt flow index of Surlyn®9910 is about 0.7. Additional examples include Iotek 4000, Iotek 4010, Iotek 8000, Iotek 8020, Iotek 8030, Iotek 7010 and Iotek 7030 which are sold by Exxon Corporation. It is to be understood that the above examples are for illustrative purposes and are by no means intended to be limiting.

Non-limiting examples of soft ionomers to be blended with the above-described hard ionomers to form the inner cover layer 14 of the inventive golf ball comprise sodium, zinc magnesium, calcium, manganese, nickel, barium, tin, copper, potassium or lithium, etc. salts of a terpolymer of an olefin having from about 2 to 8 carbon atoms, acrylic acid or methacrylic acid, and a softening comonomer which is an unsaturated monomer of the acrylate ester class having from 1 to 21 carbon atoms. The soft ionomer is preferably an ionomer made from an acrylic acid-based polymer and an unsaturated monomer of the acrylate ester class. The soft (low modulus) ionomers have a hardness from about 20 to 40 as measured on the Shore D scale and a flexural modulus from about 1,000 to about 15,000, as measured in accordance with ASTM method D-790.

Certain ethylene-acrylic acid based soft ionomer resins developed by the Exxon Corporation under the designation "lotek 7510" may be combined with known hard ionomers such as those indicated above to produce the inner cover. The combination produces higher CORs at equal or lower levels of hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials costs and improved yields. Furthermore, lotek 7520, Surlyn® 8320 and Surlyn® 8120 also can be used.

It has been determined that when hard-soft ionomer blends are used for the inner cover layer, good results are achieved when the relative combination is in a range of about 90 to about 10% hard ionomer and about 10 to about 90% soft ionomer. The results are improved by adjusting the range to about 75 to 25% hard ionomer and 25 to 75% soft ionomer. Even better results are noted at relative ranges of about 60 to 40% hard ionomer resin and about 40 to 60% soft ionomer resin.

A further embodiment of the ionomer resins utilized in connection with the inner cover layer of the golf ball of the present invention includes the use of high flow ionomer resins. These high flow ionomer resins typically have a melt index of from about 3.5 to 5.5 and are used in an amount of up to about 50% of the inner cover layer (or, alternatively, 50% or less of the inner cover layer). In a more limited embodiment, the aforesaid ionomer resins have an acid content of about 15% of less, are at least 10% neutralized and have a Shore D hardness of at least 65 or less.

Specific formulations which may be used in the cover composition are included in the examples set forth in U.S. Pat. No. 5,120,791 and 4,884,814. The present invention is in no way limited to those examples.

The outer cover layer 16 of the golf ball is harder than the inner cover layer and generally, but not necessarily, has a different chemical composition than the inner cover layer. The outer cover layer 16 preferably, but not necessarily, comprises a high acid ionomer resin or high acid ionomer blend in which more than 10 weight % of the acid groups are neutralized. Preferably, the outer cover layer 16 is formed from a blend of two or more high acid ionomer resins that are neutralized to different extents using different metal cations. Softening modifiers can be used to achieve the desired Shore hardness of the outer cover layer.

The high acid ionomers which can be used in formulating the outer cover layer of the golf ball are ionic copolymers which are the metal salts of the reaction product of an olefin having from about 2 to 8 carbon atoms and an unsaturated monocarboxylic acid having from about 3 to 8 carbon atoms. As nonlimiting examples, sodium, zinc, magnesium, manganese, potassium, calcium, nickel, barium, tin, copper and lithium can be used as the neutralizing cation. Preferably, the ionomeric resins are copolymers of ethylene with either acrylic or methacrylic acid. In some circumstances, an additional comonomer such as an acrylate ester, e.g. iso-n-butylacrylate, etc. can also be used to produce a somewhat softer terpolymer. The carboxylic acid groups of the copolymer are partially neutralized by the metal ions, i.e., about 10–75% or more preferably about 30–70%. Each of the high acid ionomer resins which may be included in the outer cover layer composition preferably contains more than 16% by weight of a carboxylic acid, preferably 17–25% by weight of a carboxylic acid, and most preferably about 18.5–21.5% by weight of a carboxylic acid. Examples of commercially available high acid methacrylic acid-based ionomers which can be used in accordance with the invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21% by weight methacrylic acid.

A further embodiment utilizes, as outer cover layer ionomers, ionomer resins which are copolymers of ethylene with either acrylic acid or methacrylic acid, or a precursor therof, having a melt index of from about 50 to about 90 and having an acid content of at least about 16%. In a more limited embodiment, these ionomer resins typically are neutralized to at least about 10% and have a Shore D hardness of at least about 60.

Examples of high acid acrylic acid-based ionomers which can be used in the present invention also include the Escor® or lotek High Acid Ethylene Ionomers produced by Exxon, including lotek Ex-959 and lotek Ex-960. Furthermore, a number of other high acid ionomers neutralized to various extents by different types of metal cations, including manganese, lithium, potassium, calcium and nickel and several new high acid ionomers and/or high acid ionomer blends other than sodium, zinc and magnesium are now available for golf ball cover production.

As indicated above, softening comonomers can be included in the ionomeric inner and/or outer cover layers. Non-limiting examples of a softening comonomer include vinyl esters of aliphatic carboxylic acids wherein the acids have 2 to 10 carbon atoms, vinyl ethers wherein the alkyl group contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Examples of a number of copolymers suitable for use to produce the high acid ionomers used in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

As indicated above, the inner cover layer 14 and/or outer cover layer 16 optionally may include hardening or softening modifiers, non-limiting examples of which include a metal stearate, such as zinc stearate, or another fatty acid salt, as described in commonly assigned U.S. Pat. Nos. 5,306,760 and 5,312,857. One purpose of the metal stearate or other fatty acid salt is to reduce the cost of production of the ball without effecting overall performance of the finished ball. Furthermore, polar-group modified rubbers can be blended with ionomers as described, for example, in commonly assigned U.S. Pat. Nos. 4,986,545, 5,098,105, 5,187, 013, 5,330,837 and 5,338,610. Thermoplastic elastomers which act as hardening or softening agents, including polyurethane, a polyester elastomer such as that sold by DuPont as Hytrel®, a polyester polyurethane such as B.F. Goodrich Company's Estane® polyester polyurethane X-4517, and a polyester amide such as that sold by Elf Atochem S.A. under the name Pebax®, can be added. A plastomer such as that sold by Exxon under the name Exact™, e.g., Exact™ 4049 can be included. Various plasticizers and processing aids also can be used.

When the golf ball of the invention has more than two cover layers, the inner cover layer as defined in this application can be formed from two or more layers which, taken together, meet the requirements of softness, thickness and compression of the layer or layers which are defined herein as the inner cover layer. Similarly, the outer cover layer can be formed from two or more layers which, taken together, meet the requirements of hardness, thickness and compression of the layer or layers which are defined herein as the outer cover layer. Furthermore, one or more additional, very thin ionomeric or non-ionomeric layers can be added on either side of the inner cover layer as long as the objectives of the invention are achieved.

Having generally described the invention, the following examples are included for purposes of illustration so that the invention may be more readily understood and are in no way intended to limit the scope of the invention unless otherwise specifically indicated.

EXAMPLE 1

About 2 dozen thermoset polybutadiene golf ball cores having a conventional composition, a PGA compression of 93, a COR of 0.782 and a diameter of 1.47 inches were molded in a conventional manner. An inner cover layer of a first ionomer formed from a blend of a soft acrylic acid based ionomer containing a softening comonomer and a hard acrylic acid based ionomer, designated as ionomer 1, having a thickness of 0.050 inches and a Shore D hardness of 55 was injection molded over the cores. The resulting covered cores had a PGA compression of 94 and a COR of 0.789.

An outer cover layer formed from a blend of two hard acrylic acid based ionomers and designated as ionomer 2 was injection molded over the inner cover layer. The outer cover layer had a thickness of 0.055 inches and a Shore D hardness of 68. The balls were primed and clear coated in a uniform manner. The balls with the two-part cover had an average PGA compression of about 99, and a COR of about 803. The spin rate of the balls was determined by striking the balls with a 9-iron under conditions of launch angle, ball speed and tee position which produced a spin rate of about 7100 rpm for a two-piece hard covered ball (1994 Top-Flite XL) and a spin rate of about 9700 rpm for a thread wound balata covered ball (1994 Titleist Tour 100) using the same club.

The properties of the balls, core and cover layers are shown on Table 1.

EXAMPLES 2–4

The procedure of Example 1 was repeated using three different combinations of inner and outer cover layer materials at the same cover layer thicknesses. The results are shown on Table 1.

COMPARATIVE EXAMPLES 1–2

The procedure of Example 1 was repeated with the exception that the same material was used for the inner and outer cover layers of a particular ball. In Comparative Example 1, two layers of ionomer 2 were used. In Comparative Example 2, two layers of example 4 were used. The results are shown on Table 1.

While the balls of Comparative Examples 1 and 2 exhibited favorable COR, their PGA compressions were unfavorably high. On the other hand, the balls of Examples 1–3 had favorable soft compressions while maintaining good COR. The balls of example 4 had a reasonably good compression while maintaining a good COR. It is also noted that the balls of Examples 1–2 had a somewhat higher spin rate than the balls of Comparative Example 1, and the balls Examples 3–4 had a somewhat higher spin rate than the balls of Comparative Example 2. This slightly higher spin will contribute to improved playability and feel versus the balls of Comparative Examples while still being relatively low in spin as compared to soft covered balls.

Comparative Examples 3–6

Conventional thermoset polybutadiene golf ball cores having a diameter of 1.57 inches, a PGA compression of 88, and a COR of 780 were covered with a single layer of cover material having a thickness of 0.055 inches. Four different types of ionomeric covers were used. The balls were then primed and clear coated in the same manner as the balls of Examples 1–4. The resulting two-piece golf balls had measurements of PGA compression, COR, Shore D cover hardness, and spin as shown on Table 1.

As shown in Comparative Examples 3–6, the COR of the golf balls increased as the hardness of the ball increased. As shown by comparative Example 6, ionomer 1 is too soft for use alone as an outer cover layer and results in an insufficient COR. As shown by Comparative Example 5, ionomer 3 is also soft and produced a ball having a marginally acceptable COR and a relatively hard compression. The balls of Comparative Examples 3 and 4 are inferior to the balls of Examples 1–4 because for a given COR, the PGA compressions of the balls of Comparative Examples 3 and 4 are relatively hard, even though the core compressions were softer (prior to cover molding) than those of Examples 1–4.

EXAMPLES 5–6

The procedure of Example 1 was repeated with the exception that cores having sizes of 1.43 inches and 1.545 inches were used. Furthermore, inner and outer cover layers of different thicknesses were used. The cover layer thicknesses and properties as well as resulting golf ball properties are shown on Table 1.

COMPARATIVE EXAMPLE 7

The procedure of Example 5 was repeated with the exception that the inner and outer cover layers were formed from the same material. The results are shown on Table 1.

While Example 5 and Comparative Example 7 both had ionomeric cover layers with the same overall thickness, the ball of Example 5 is superior to that of Comparative Example 7 in that the compression of the ball of Comparative Example 7 is too high. Again, the spin rate for Example 5 is somewhat higher than Comparative Example 7, which will contribute to improved feel and playability while not being so high (as with a soft-covered ball) as to cause problems (slice/hook) for the less skilled golfer. In order to reduce compression, rather than reducing the outer cover layer thickness, as was done in Comparative Example 3, Example 5 shows that by using a multi-layer ionomer cover with a softer inner layer and a harder outer layer, a golf ball having a favorable combination of relatively soft compression and good coefficient of restitution can be obtained.

As shown by Example 6, a slight reduction in the thickness of the overall ionomeric cover material does not substantially affect the compression of the ball and contributes to favorable values of COR.

EXAMPLE 7

A number of golf ball cores having the formulation shown below were formed:

| Ingredients | Parts |
|---|---|
| First polybutadiene[1] | 70 |
| Second polybutadiene[2] | 30 |
| Zinc oxide | 31 |
| Core regrind[3] | 16 |
| Zinc stearate | 16 |
| Zinc diacrylate | 21 |
| Coloring Agent | 0.37 |
| Peroxide Initiator[4] | 0.9 |

[1]Cariflex 1220, Meuhlstein, Norwalk, CT
[2]Taktene 220, Bayer Corp., Akron, OH
[3]Internal source
[4]Trigonox 29/40, Akzo Chemicals Inc., Chicago, IL The cores were compression molded at 1.500 inches and were glebarred to about 1.47 inches. An inner cover layer material containing lotek 7510, lotek 8000 and brass powder, which is a density increasing filler, was blended on a two roll mill, chopped, and molded over the cores. The diameter of the core with the inner cover layer formed thereover was about 1.57 inches. The cover layer had a thickness of about 0.050 inches. An outer cover layer of lotek 7030, lotek 8000 and ionomeric masterbatch was subsequently molded over the inner cover layer. The compositions of the inner and outer cover layers, and the properties of the golf balls are shown below on Table 2.

EXAMPLES 8–11 and COMPARATIVE EXAMPLE 8

The procedure of Example 7 was repeated except that the type of filler material in the inner cover layer was varied. No filler was included in Comparative Example 7. Properties of the resulting golf balls are shown on Table 2.

As will be apparent to persons skilled in the art, various modifications and adaptations of the structure above described will become readily apparent without departure from the spirit and scope of the invention, the scope of which is defined in the appended claims.

TABLE 1

| | | Core | | | | Inner Cover Layer | | | |
|---|---|---|---|---|---|---|---|---|---|
| Example # | Size (inches) | COMP (PGA) | Hardness (Shore D) [if ready available] | COR[1] | Material | Thickness (inches) | COMP[2] (PGA) | COR[1,3] | Hardness (Shore D) |
| 1 | 1.47 | 93 | | 782 | Ionomer 1 | 0.050 | 94 | 789 | 55 |
| 2 | 1.47 | 93 | | 782 | Ionomer 3 | 0.050 | 94 | 795 | 63 |
| Comp. 1 | 1.47 | 93 | | 782 | Ionomer 2 | 0.050 | 94 | 799 | 68 |
| 3 | 1.47 | 93 | | 782 | Ionomer 1 | 0.050 | 94 | 789 | 55 |
| 4 | 1.47 | 93 | | 782 | Ionomer 3 | 0.050 | 94 | 795 | 63 |
| Comp. 2 | 1.47 | 93 | | 782 | Ionomer 4 | 0.050 | 95 | 805 | 73 |
| Comp. 3 | 1.57 | 88 | | 780 | None | — | — | — | — |
| Comp. 4 | 1.57 | 88 | | 780 | None | — | — | — | — |
| Comp. 5 | 1.57 | 88 | | 780 | None | — | — | — | — |
| Comp. 6 | 1.57 | 88 | | 780 | None | — | — | — | — |
| 5 | 1.43 | — | | 787 | Ionomer 1 | 0.090 | 90 | 792 | 56 |
| 6 | 1.545 | 89 | | 790 | Ionomer 1 | 0.033 | 89 | 794 | 56 |
| Comp. 7 | 1.43 | — | | 787 | Ionomer 2 | 0.090 | 103 | 815 | 68 |

| | Outer Cover Layer | | | Ball | | |
|---|---|---|---|---|---|---|
| Example # | Material | Thickness (inches) | Hardness (Shore D) | COMP (PGA) | COR[1] | SPIN (RPM) |
| 1 | Ionomer 2 | 0.055 | 68 | 99 | 803 | 7508 |
| 2 | Ionomer 2 | 0.055 | 68 | 102 | 809 | 7650 |
| Comp. 1 | Ionomer 2 | 0.055 | 68 | 109 | 819 | 7390 |
| 3 | Ionomer 4 | 0.055 | 73 | 101 | 809 | 6626 |
| 4 | Ionomer 4 | 0.055 | 73 | 107 | 816 | 6358 |
| Comp. 2 | Ionomer 4 | 0.055 | 73 | 112 | 830 | 6258 |
| Comp. 3 | Ionomer 2 | 0.055 | 68 | 99 | 800 | 7331 |
| Comp. 4 | Ionomer 4 | 0.055 | 73 | 104 | 808 | 6516 |
| Comp. 5 | Ionomer 3 | 0.055 | 63 | 98 | 792 | 8421 |
| Comp. 6 | Ionomer 1 | 0.055 | 55 | 93 | 782 | 9479 |
| 5 | Ionomer 2 | 0.057 | 68 | 101 | 799 | 7435 |
| 6 | Ionomer 2 | 0.057 | 68 | 100 | 809 | 7382 |
| Comp. 7 | Ionomer 2 | 0.057 | 68 | 115 | 820 | 7230 |

[1]Actual COR values have been multipled by 1000
[2]COMP of inner cover layer and core
[3]COR of inner cover layer and core

TABLE 2

| | Example # | | | | | Comp. 8 |
|---|---|---|---|---|---|---|
| | 7 | 8 | 9 | 10 | 11 | |
| Core | | | | | | |
| Size (in.) | 1.469 | 1.469 | 1.469 | 1.469 | 1.469 | 1.469 |
| PGA Compression | 69 | 69 | 69 | 69 | 69 | 69 |
| COR (× 1000) | 782 | 782 | 782 | 782 | 782 | 782 |
| Shore C/D Hardness | 83/48 | 83/48 | 83/48 | 83/48 | 83/48 | 83/48 |
| Inner Cover Layer | | | | | | |
| Ingredients (parts) | | | | | | |
| Iotek 7510 | 70 | 70 | 70 | 70 | 70 | 70 |
| Iotek 8000 | 30 | 30 | 30 | 30 | 30 | 30 |
| Brass | 5 | — | — | — | — | — |
| Stainless Steel | — | 5 | — | — | — | — |
| Titanium | — | — | 5 | — | — | — |
| Zirconium Oxide | — | — | — | 5 | — | — |
| Graphite | — | — | — | — | 5 | — |
| Data | | | | | | |
| Size (in.) | 1.573 | 1.574 | 1.575 | 1.575 | 1.573 | 1.575 |
| Thickness (in.) | 0.052 | 0.053 | 0.053 | 0.053 | 0.053 | 0.053 |
| Weight (g) | 38.9 | 38.9 | 38.9 | 38.9 | 38.7 | 38.6 |
| PGA Compression | 69 | 69 | 70 | 70 | 71 | 70 |
| COR (× 1000) | 781 | 781 | 781 | 783 | 779 | 782 |
| Shore C/D Hardness | 65/41 | 66/44 | 65/43 | 67/44 | 61/38 | 69/42 |
| Outer Cover Layer | | | | | | |
| Ingredients (parts) | | | | | | |
| Iotek 8000 | 45.3 | 45.3 | 45.3 | 45.3 | 45.3 | 45.3 |
| Iotek 7030 | 45.3 | 45.3 | 45.3 | 45.3 | 45.3 | 45.3 |
| Masterbatch | 9.4 | 9.4 | 9.4 | 9.4 | 9.4 | 9.4 |
| Finished Ball Data | | | | | | |
| Size (in.) | 1.684 | 1.684 | 1.684 | 1.684 | 1.684 | 1.684 |
| Thickness (in.) | 0.055 | 0.055 | 0.055 | 0.055 | 0.055 | 0.055 |
| Weight (g) | 46 | 46 | 45.9 | 45.9 | 45.7 | 45.7 |
| PGA Compression | 82 | 81 | 82 | 83 | 84 | 83 |
| COR (× 1000) | 798 | 797 | 798 | 799 | 793 | 799 |
| Shore C/D Hardness | 95/67 | 95/67 | 95/67 | 95/67 | 95/67 | 95/67 |

What is claimed is:

1. A golf ball, comprising:
   a core,
   an inner cover layer comprising at least 50 parts by weight ionomer having an average weight % acid content of about 15 or less which is at least 10% neutralized and having a Shore D hardness of about 65 or less, and
   an outer cover layer comprising at least 50 parts by weight of ionomer selected from ethylene acrylic acid or an ethylene methacrylic acid precursor having an average weight % acid of at least about 16 which is at least 10% neutralized and a melt index of 50 to 90, the outer cover layer being harder than the inner cover layer and having a Shore D hardness of at least about 60,
   the sum of the thickness of the inner cover layer and the thickness of the outer cover layer being at least 0.090 inches.

2. A golf ball according to claim 1, wherein the ball has a coefficient of restitution of at least 0.780.

3. A golf ball according to claim 1, wherein the inner cover layer has a thickness of about 0.025–0.200 inches.

4. A golf ball according to claim 3, wherein the outer cover layer has a thickness of about 0.025–0.200 inches.

5. A golf ball according to claim 1, wherein the inner cover layer has a Shore D hardness of 63 or less.

6. A golf ball according to claim 5, wherein the outer cover layer has a Shore D hardness of at least 65.

7. A golf ball according to claim 1, wherein the core comprises a thermoset rubber.

8. A golf ball according to claim 1, wherein the inner cover layer comprises a blend of a hard ionomer and a soft ionomer.

9. A golf ball according to claim 1, wherein the PGA compression of the ball is no more than about 110.

10. A golf ball according to claim 1, wherein the PGA compression of the ball is no more than about 100.

11. A golf ball, comprising:
    a core,
    an inner cover layer comprising at least 50 parts by weight ionomer having an average weight % acid content of about 15 or less which is at least 10% neutralized and having a Shore D hardness of about 65 or less, further wherein at least 50% or less of said ionomer of said inner cover layer is a high flow ionomer having a melt index of 3.5 to 5.5, and
    an outer cover layer comprising at least 50 parts by weight of ionomer having an average weight % acid of at least about 16 which is at least 10% neutralized, the outer cover layer being harder than the inner cover layer and having a Shore D hardness of at least about 60,
    the sum of the thickness of the inner cover layer and the thickness of the outer cover layer being at least 0.090 inches.

12. A golf ball according to claim 11, wherein the ball has a coefficient of restitution of at least 0.780.

13. A golf ball according to claim 11, wherein the inner cover layer has a thickness of about 0.025–0.200 inches.

14. A golf ball according to claim 13, wherein the outer cover layer has a thickness of about 0.025–0.200 inches.

15. A golf ball according to claim 11, wherein the inner cover layer has a Shore D hardness of 63 or less.

16. A golf ball according to claim 15, wherein the outer cover layer has a Shore D hardness of at least 65.

17. A golf ball according to claim 11, wherein the core comprises a thermoset rubber.

18. A golf ball according to claim 11, wherein the PGA compression of the ball is no more than about 110.

19. A golf ball according to claim 11, wherein the PGA compression of the ball is no more than about 100.

20. A golf ball, comprising:
    a core,
    an inner cover layer comprising at least 50 parts by weight ionomer having an average weight % acid content of about 15 or less which is at least 10% neutralized and having a Shore D hardness of about 65 or less, and
    an outer cover layer comprising at least 50 parts by weight of ionomer having an average weight % acid of at least about 16 which is at least 10% neutralized, the outer cover layer being harder than the inner cover layer and having a Shore D hardness of at least about 60, the sum of the thickness of the inner cover layer and the thickness of the outer cover layer being at least 0.090 inches, further wherein the diameter of the golf ball is from about 1.58 to about 1.67 inches.

21. A golf ball according to claim 20 wherein the diameter of the golf ball is from about 1.58 inches to about 1.65 inches.

22. A golf ball according to claim 20 wherein the diameter of the golf ball is from about 1.58 inches to about 1.62 inches.

* * * * *

UNITED STATES PATENT AND TRADEMARK OFFICE
CERTIFICATE OF CORRECTION

PATENT NO. : 6,450,899 B1
DATED : September 17, 2002
INVENTOR(S) : Mark L. Binette and Thomas J. Kennedy, III It is certified that error appears in the above-identified patent and that said Letters Patent is hereby corrected as shown below:

<u>Title page,</u>
Item [63], "Continuation-in-part of application No. 09/337,918, filed on Jun. 29, 1999," should read -- Continuation-in-part of application No. 09/337,918, filed on Jun. 22, 1999, --

Signed and Sealed this

Twenty-fifth Day of February, 2003

JAMES E. ROGAN
*Director of the United States Patent and Trademark Office*